US009116514B2

(12) United States Patent
LaFountain

(10) Patent No.: US 9,116,514 B2
(45) Date of Patent: Aug. 25, 2015

(54) CONFIGURABLE PROCESS CONTROL DEVICE WITH ELECTRONIC DISPLAY ASSEMBLY

(71) Applicant: Robert Lynn LaFountain, Charlestown, IN (US)

(72) Inventor: Robert Lynn LaFountain, Charlestown, IN (US)

(73) Assignee: General Equipment and Manufacturing Company, Inc., Louisville, KY (US)

( * ) Notice: Subject to any disclaimer, the term of this patent is extended or adjusted under 35 U.S.C. 154(b) by 0 days.

(21) Appl. No.: 13/690,237

(22) Filed: Nov. 30, 2012

(65) Prior Publication Data

US 2014/0151587 A1  Jun. 5, 2014

(51) Int. Cl.
*F16K 31/00* (2006.01)
*G05B 15/02* (2006.01)
*G05B 19/042* (2006.01)

(52) U.S. Cl.
CPC ............... *G05B 15/02* (2013.01); *F16K 31/00* (2013.01); *G05B 19/042* (2013.01); *G05B 2219/25082* (2013.01); *G05B 2219/25428* (2013.01)

(58) Field of Classification Search
CPC ............ G05B 19/042; G05B 2219/25082; G05B 2219/25428; F16K 31/04; F16K 31/047; F16K 37/00; F16K 37/0075
USPC .............. 137/551, 554; 251/129.04, 129.12; 40/448, 902, 914
See application file for complete search history.

(56) References Cited

U.S. PATENT DOCUMENTS

| 4,844,110 | A  | * | 7/1989 | Paley ................................. 137/1 |
| 5,033,012 | A  | * | 7/1991 | Wohld ............................. 702/41 |
| 5,433,245 | A  | * | 7/1995 | Prather et al. ................. 137/554 |
| 6,339,373 | B1 | * | 1/2002 | Zeskind et al. ............... 340/534 |
| 6,401,740 | B2 | * | 6/2002 | Zaiser .............................. 137/1 |
| 6,945,509 | B2 | * | 9/2005 | Royse ....................... 251/129.04 |
| 7,114,510 | B2 | * | 10/2006 | Peters et al. ...................... 137/1 |
| 7,137,408 | B2 | * | 11/2006 | Royse ........................... 137/556 |
| 7,784,490 | B1 | * | 8/2010 | Stewart et al. ................ 137/556 |
| 8,047,501 | B2 | * | 11/2011 | Porath ........................ 251/30.04 |
| 8,342,478 | B1 | * | 1/2013 | Cordray et al. .......... 251/129.03 |

(Continued)

FOREIGN PATENT DOCUMENTS

EP  1331535 A1  7/2003

OTHER PUBLICATIONS

Valvetop D-Series Valve Controllers Master Installation, Operation & Maintenance Manual, 2009.

(Continued)

*Primary Examiner* — Matthew W Jellett
(74) *Attorney, Agent, or Firm* — Marshall, Gerstein & Borun LLP

(57) ABSTRACT

A configurable process control device, which includes a field device, such as a valve position controller, that can be configured by a user to emulate any one of a plurality of different types of process control devices, is provided with an electronic display assembly. The electronic display assembly is operatively connected with a control circuit that is arranged to respond to the specific configuration of the field device to cause the electronic display assembly to display information relevant to the specific type of control device the field device has been configured to emulate. The information may include safety certification information specific to each of the different types of process control devices that the field device can be configured to emulate.

18 Claims, 4 Drawing Sheets

(56) References Cited

U.S. PATENT DOCUMENTS

2004/0153176 A1      8/2004   Romagnoli et al.
2007/0034264 A1*     2/2007   Kunz et al. .................... 137/554
2007/0290788 A1     12/2007   Erkens

OTHER PUBLICATIONS

Search Report for PCT/US2013/072194, mailed Feb. 7, 2014.
Written Opinion for PCT/US2013/072194, mailed Feb. 7, 2014.
International Preliminary Report on Patentability for International application No. PCT/US2013/072194, dated Jun. 2, 2015.

* cited by examiner

CONFIGURABLE PROCESS CONTROL DEVICE WITH ELECTRONIC DISPLAY ASSEMBLY

FIELD OF THE INVENTION

The present invention relates generally to a selectively configurable process control device including a field device and an electronic display assembly for displaying information relating to the configuration of the field device.

BACKGROUND

In industrial process control environments, it is often necessary for a piece of process control equipment located along the process equipment and/or piping to meet certain minimum performance characteristics to ensure that the piece of control equipment is operating in accordance with minimum operational standards. By way of example, such process control environments may include industrial processing, mining, manufacturing, petrochemical extraction, transportation, and refining, energy production facilities, and the like. An individual piece of process control equipment is often referred to as a "field device." Some typical exemplary field devices include sensors, switches, valve controllers, and/or valves. These minimum performance characteristics and minimum operational standards generally are intended to ensure that the process control environment meets some given applicable standards for performance and/or safety.

It is often necessary to provide information relative to these performance characteristics and/or operational standards directly on or immediately associated with the field device so as to be visible to a person when in the process control environment. Such information often includes, for example, safety certification information and/or other information specific to that particular field device.

To associate the safety or certification information with a field device, it is common to fix the information onto a nameplate, such as a metal tag. The nameplate is then secured directly onto the field device. For example, for a proximity sensor switch rated for use in an environment where functionality must be ensured under possible explosive conditions, the certification information would be written or stamped on a metal tag. The tag would be secured directly to the outside of a housing for the proximity sensor switch with glue or rivets so as to be visible during use in the process control environment. Alternatively, the certification information could be written directly on the housing.

Although this method of associating certification information is suitable for a field device that can function in only one specific manner, the conventional approach is not convenient or suitable for a field device that can be configured to be used in different manners having different certification requirements. For example, on a configurable process control device, such as a proximity sensor switch that is adapted to be configured to emulate more than one type of switch, the nameplate would need to be changed to display the appropriate certification information every time the proximity sensor is configured or reconfigured to emulate a different type of switch. This can be both costly and inconvenient for the user. Consequently, there is a need for an improved system of displaying information about a configurable process control device on or immediately associated with the device.

SUMMARY

According to some aspects of the disclosure, a configurable process control device includes one or more field devices that can be selectively configured or otherwise arranged by a user to emulate any one of a plurality of different types of process control devices. The configurable process control device has an electronic display assembly. The electronic display assembly is operatively arranged to display information relevant to the specific type of process control device the field device has been configured to emulate in response to the specific configuration of the field device. The field device may include, by way of non-limiting example, one or more proximity switches, such as GO™-switches, and the proximity switch(es) may be configured to emulate different types of process control devices, such as an inductive switch, a numar switch, a dry contact switch, a PNP switch, and/or an NPN switch.

In one exemplary aspect, a configurable process control device for use in a plurality of use environments is disclosed. At least one of a pre-defined plurality of certifications must be displayed in conjunction with the configurable process control device depending on which of the use environments the configurable process control device is to be used in. The configurable process control device includes a field device, a first control circuit, an electronic display assembly, and a second control circuit. The first control circuit is operatively coupled to the field device. The first control circuit controls the field device and is arranged to be reconfigured to allow the field device to selectively emulate any of a plurality of different process control device types. The electronic display assembly is arranged to selectively display different information. The second control circuit is operatively coupled to the electronic display assembly and the first control circuit. The second control circuit has access to a plurality of different certification information sets, each corresponding to a different one of the process control device types. The second control circuit causes the electronic display assembly to display a selected one of the certification information sets corresponding to the process control device type the field device has been selected to emulate.

According to another exemplary aspect, a valve position controller includes a controller housing, a switch carried by the controller housing, a switch control circuit, an electronic display assembly, and a display control circuit. The switch control circuit is arranged to control the switch and arranged to be selectively reconfigured by a user to cause the switch to selectively emulate any of a pre-selected plurality of different switch types. The electronic display assembly is carried by the controller housing and arranged to selectively display different information. The display control circuit is operatively connected to the electronic display assembly and the switch control circuit. The display control circuit has access to a plurality of different information sets, each information set containing attributes of a corresponding one of the switch types. The display control circuit causes the electronic display assembly to display a selected one of the information sets corresponding to which switch type the switch is configured to emulate.

According to a further exemplary aspect, a method of displaying certification information for a configurable process control device is disclosed. The configurable process control device includes a field device and a device control circuit. The device control circuit is arranged to be configured in any one of a pre-selected plurality of configurations to cause the field device to emulate any one of a pre-selected plurality of different types of process control devices. The method includes the steps of configuring the device control circuit to cause the field device to emulate a first selected one of the process control devices; providing an electronic display with the field device; and configuring the electronic display to display first certification information in response to the configuration of the device control circuit.

In accordance with any one or more of the foregoing aspects, a configurable process control device and/or a method of displaying certification information for a configurable process control device may further include any one or more of the following preferred forms and/or features.

The field device may include a switch assembly or switch, which may include a magnetic proximity switch. The field device may include a valve position controller. The field device, the switch housing, and/or the electronic display assembly may be rated for use in hazardous areas.

The switch control circuit may form the first control circuit. The first control circuit may include at least one lead arranged to be selectively configured to complete any one of a plurality of different circuits, each of which may correspond to one of a pre-selected plurality of different switch types, such as an inductive switch, a numar switch, a dry contact switch, a PNP switch, and/or an NPN switch. The first control circuit may include a digital processor. The digital processor may be adapted to be configured by a software program to form circuits arranged to allow the field device to selectively emulate one or more of the selected types of process control devices, such as different switch types. The first control circuit may include a communication port. The first control circuit may be adapted to allow a software program to be loaded to the digital processor. The first control circuit may be selectively configured to cause the process control device to emulate at least a second selected one of the different types of process control devices.

Each of the information sets may include certification information for a corresponding one of the different types of process control devices, such as the different switch types. The certification information may identify the type of hazardous area or areas in which the selected switch type is rated for acceptable use.

The electronic display assembly may include a display housing carried by the switch housing. The electronic display assembly may include an electronic display screen. The electronic display screen may be disposed inside the display housing. The electronic display screen may include a liquid crystal display, a light emitting diode display, an electroluminescent display, and/or a plasma display. One or more portions of the display assembly may be secured to the process control device. The electronic display assembly may be reconfigured to display second certification information in response to reconfiguration of the device control circuit.

The display control circuit may form the second control circuit. The display control circuit may include a microcontroller, such as an integrated circuit, and optionally a digital memory. The information sets may be stored in the digital memory. The microcontroller may be arranged to select the selected one of the information sets from the digital memory in response to signals received from the first control circuit and/or the field device and to cause the electronic display assembly to show information representative of the selected one of the information sets.

The configurable process control device may include a housing. One or more portions of the electronic display assembly may be carried by the housing.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

DETAILED DESCRIPTION

Figure 1:
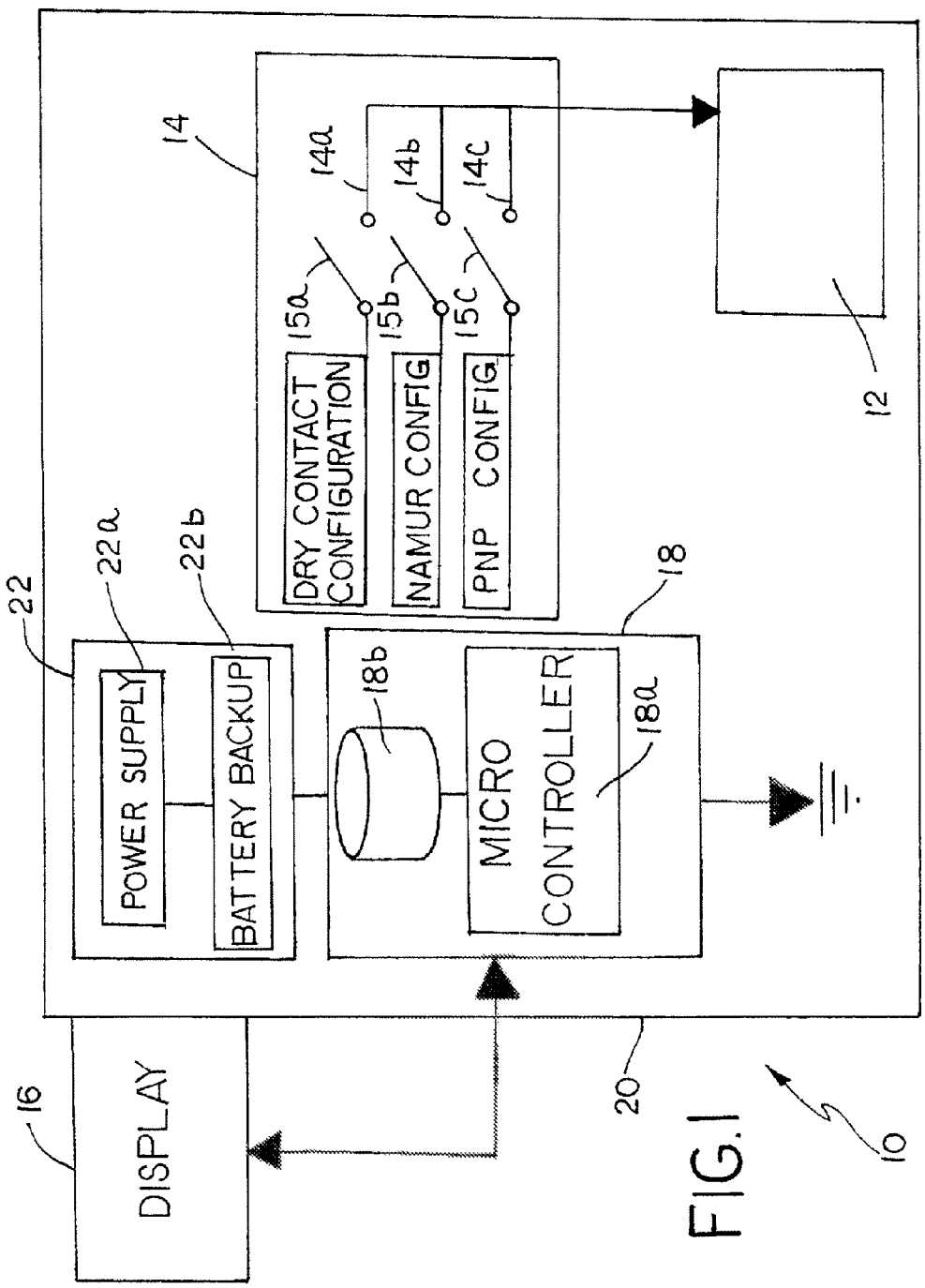
FIG. 1 is a schematic diagram of a configurable process control device according to some aspects the present invention.

Turning now to the drawings, FIG. 1 shows a configurable process control device 10 that can be configured to be used in any of a plurality of different use environments, such as in different types of hazardous use environments. One of a preselected plurality of certifications is to be displayed in conjunction with the configurable process control device 10. Which certification is displayed depends on which of the use environments the configurable process control device 10 is configured to be used in.

The configurable process control device 10 includes a field device 12, a first control circuit 14, an electronic display assembly 16, and a second control circuit 18. The field device 12 may be configured to emulate any of two or more different types of process control devices. The first control circuit 14 is operatively coupled to the field device 12 and is arranged to control operation of the field device. Further, the first control circuit 14 is arranged to be selectively configured and/or reconfigured by a user to cause the field device 12 to emulate any selected one of the types of process control devices. The electronic display assembly 16 is arranged to display different information relevant to the selected type of process control device. The second control circuit 18 is operatively coupled with the electronic display assembly 16. The second control circuit is operatively coupled with the first control circuit 14 and/or the field device 12 to sense which type of process control device is being emulated. The second control circuit 18 also has access to a plurality of different information sets, such as certification information sets, wherein each information set corresponds to a different one of the different types of process control devices. The second control circuit 18 is arranged to cause the electronic display assembly 16 to display a selected one of the certification information sets that corresponds to the selected type of process control device that the field device 12 has been configured to emulate.

The field device 12 is a device that is used in an industrial process control system or environment and located along the process piping and/or process equipment. In some exemplary arrangements, the field device 12 may be a level transmitter, a flow transmitter, a pressure transmitter, a switch, a sensor, a valve, a valve actuator, and/or combinations or sub-combinations thereof. In one example, the field device 12 includes one, two, or more proximity sensor switches, wherein the proximity sensor switches may be rated for use in various hazardous conditions, such as in nuclear energy facilities, petrochemical extraction and refining facilities, underwater and deep sea environments, and/or mining facilities. In one optional exemplary arrangement, the field device 12 includes one or more magnetic proximity sensor switches, such as a GO Switch™ produced by TopWorx of Emerson Process Management. Some non-limiting examples of the process control system or environment include process flow arrangements for a petrochemical refinery, petrochemical extraction, and/or petrochemical transport system; chemical process flow arrangements in a chemical plant; water piping and/or steam piping in industrial applications; and other types of controlled process flow arrangements and/or piping in various industrial facilities, such as energy production facilities, manufacturing facilities, and resource extraction facilities.

The first control circuit 14 is an electrical circuit that can be configured and/or reconfigured by a user. For example, where the field device 12 includes one or more proximity sensor switches, a user can configure the first control circuit 14 to cause the proximity sensor switches to emulate different types of switches, such as a two-wire proximity switch, an inductive switch, a numar switch, a dry contact switch, a PNP switch, and/or an NPN switch. The first control circuit 14 may be an analog circuit, a digital circuit, or a combination of analog and digital circuits. The first control circuit 14 may be configured physically, for example by physically manipulating wires, switch connections, and/or other physical circuit components of an analog circuit, and/or the first control circuit 14 may be configured digitally, for example by uploading or otherwise providing software command coding to configure a digital micro-controller or the like. In one exemplary arrangement, the first control circuit 14 includes an analog circuit, wherein one or more reconfigurable circuit connectors or leads, such as jumper wires, can be selectively configured by the user to complete any one or more of a plurality of different electrical circuits. Each different circuit causes the field device 12 to emulate a different type of process control device, each of which is associated with different information, such as safety certification information, displayed with the configurable process control device 10. For example, the first control circuit 14 may include three different configurable circuits 14a, 14b, 14c. Each configurable circuit 14a, 14b, 14c may be selectively opened or closed with a respective jumper wire 15a, 15b, 15c. If only configurable circuit 14a is completed, for example by closing the circuit with jumper wire 15a, the field device 12 emulates a first process control device type, such as a dry contact switch. If only the configurable circuit 14b is completed, for example by closing the circuit with jumper wire 15b, the configurable field device 12 emulates a second process control device type, such as a namur switch. If only the third configurable circuit 14c is completed, for example by closing the circuit with jumper wire 15c, the field device 12 emulates a third process control device type, such as a PNP switch. Various combinations of completed circuits 14a-14c are also contemplated.

The electronic display assembly 16 preferably includes an electronic display adapted to selectively display many different types of text and/or graphics information, such as a light emitting diode (LED) display, a liquid crystal display (LCD), an electroluminescent display, a plasma display, and/or other type of electronic display. The electronic display assembly 16 is operatively coupled to the field device 12 and/or the first control circuit 14 in a manner adapted to cause the electronic display to display selected information in response to what type of process control device the field device 12 has been selected to emulate by the configuration of the first control circuit 14. What information is displayed depends on the selected type of process control device.

The second control circuit 18 may take any form of electrical circuit capable of causing the electronic display assembly 16 to display correct selected information regarding the type of process control device the field device 12 has been selected to emulate. The second control circuit 18 may be combined with the first control circuit 14 or may be separate from the first control circuit 14. In one arrangement, the second control circuit 18 includes a digital micro-controller 18a and a digital memory 18b. The digital micro-controller 18a is operatively connected with the electronic display assembly 16 and the first control circuit 14. The digital memory 18b is arranged to store the various information sets appropriate for use with each of the different types of process control devices that the field device 12 can be configured to emulate. The micro-controller 18a includes circuitry that is arranged to select the appropriate information set or sets to display in response to the configuration of the first control circuit 14. The micro-controller 18a includes circuitry that is arranged to cause the electronic display assembly 16 to display the selected information set or sets on the electronic display. The digital micro-controller 18a and/or the digital memory 18b may be formed with one or more integrated circuits. The digital micro-controller 18a and the digital memory 18b may be combined or separate, as long as the digital micro-controller 18a is able to access and retrieve the selected information set or sets from the digital memory 18b.

In one optional arrangement, the information sets stored and/or accessed by the second control circuit 18 include safety certification information regarding what environments the configurable process control device 10 may be used in when configured to emulate any of the types of different process control devices. For example, where the field device 12 includes a proximity sensor switch that can be configured to emulate different types of switches certified for use in various different hazardous or safety-critical operating environments, the information sets may include certification information regarding the operating environments for which each type of switch is certified for use. When the first control circuit 14 is configured to cause the field device 12 to emulate a first type of switch, such as one certified for use in an environment that requires specific operating characteristics under explosion circumstances, the micro-controller 18 is arranged to cause certification information relative to that first type of switch to be displayed by the electronic display assembly 16. Similarly, when the first control circuit 14 is configured to cause the field device 12 to emulate a second type of switch, such as one certified for use in an environment that requires specific operating characteristics in a nuclear power plant, the micro-controller 18 is arranged to cause certification information relative to the second type of switch to be displayed by the electronic display assembly 16. Of course, this example can be expanded to any practicable number of different types of process control devices and different certification information sets. In this manner, the field device 12 can be configured to emulate any selected one of a plurality of different types of process control devices, and the electronic display assembly 16 is arranged to display appropriate information relative to the selected type of process control device.

In some optional arrangements, the configurable process control device 10 includes at least one housing 20 that carries the electronic display assembly 16 and the field device 12 as a single unit suitable for attachment to a mounting structure, such as a valve, pipe, valve actuator, vessel, pump, and/or other component of a process control system. In a preferred optional arrangement, the housing 20 is arranged to carry and/or otherwise connect each of the field device 12, the first control circuit 14, the electronic display assembly 16, and the second control circuit 18 as a single unit. The housing 20 may carry additional components and/or one or more components may be remote from the housing 20.

The configurable process control device 10 also preferably includes access to an electric power supply 22 for powering any combination or all of the first and second control circuits 14 and 18, the field device 12 (if appropriate), and/or the electronic display 16. The electric power supply 22 may be in any form sufficient to power the selected components of the configurable process control device 10. The electric power supply 22 includes either or both of an external power circuit 22a and an internal power circuit 22b. The external power circuit 22a is arranged to receive AC and/or DC electrical power, for example from a plant power system, and provide the received electrical power to the various components 12, 14, 16, 18 in a form suitable for use thereby, such as converted to a low voltage DC power stream. The internal power circuit 22b is arranged to provide power to the various components 12, 14, 16, 18, such as a battery for providing primary power and/or a battery backup system arranged to provide backup power in the event of losing primary power from the external power circuit 22a. In a preferred optional arrangement, the power supply 22 includes both the external power supply circuit 22a for connection to plant power and an internal battery backup power circuit 22b, for example, to provide uninterrupted power in the event of a break in the plant power.

Figure 2A:
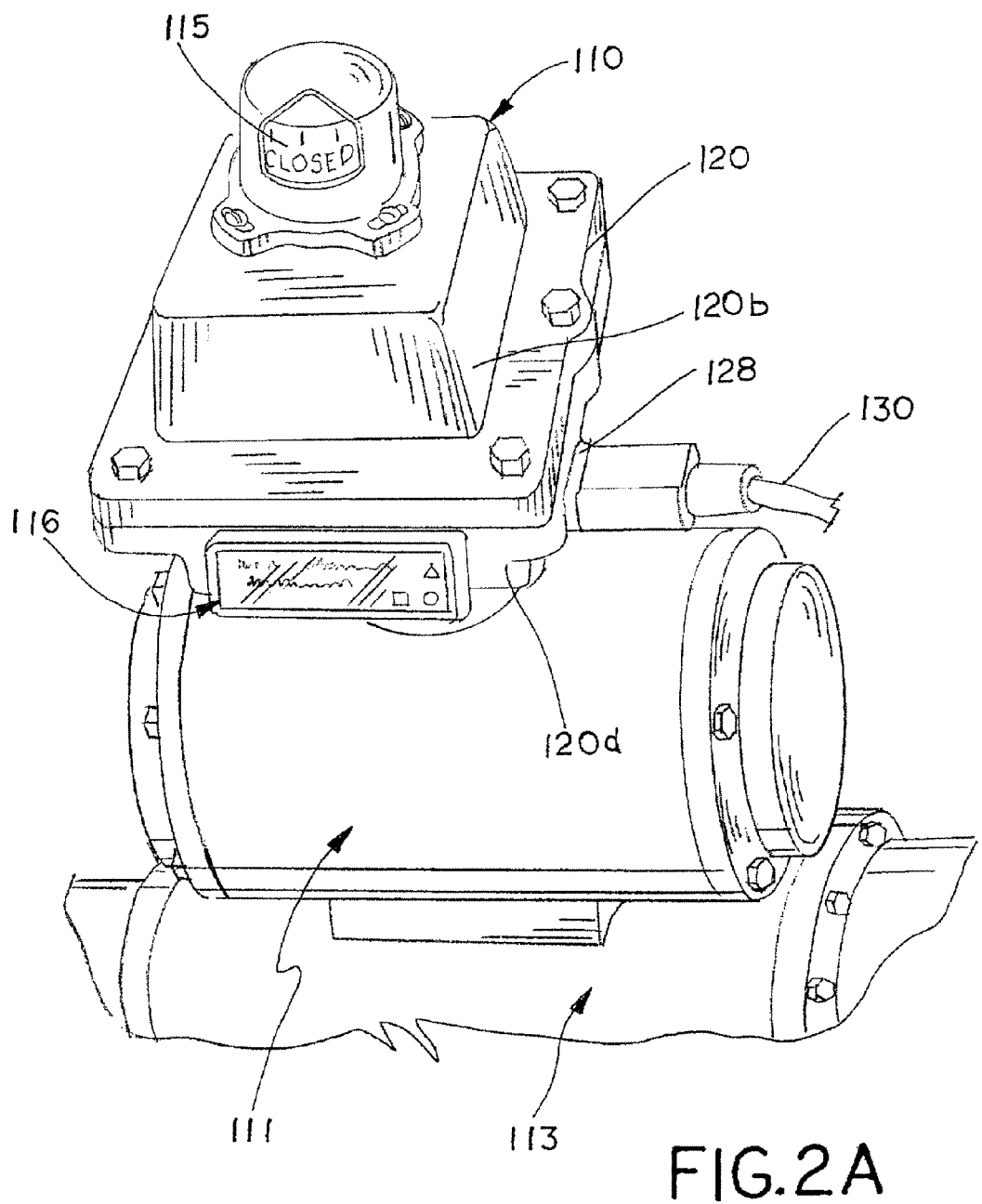
FIG. 2A is an isometric view of an example valve, valve actuator, and configurable valve position controller including an electronic display according to the teachings of the present disclosure.

FIG. 2A shows one exemplary arrangement of the configurable process control device 10 in the form of a valve position controller 110 for an actuator 111 operatively connected to a flow control valve 113 to control the position of a flow control member (not visible) inside the flow control valve 113. The position controller 110 is preferably adapted to sense the position of the valve actuator 111 and indicate a position of the valve actuator, and by extension, the position of the flow control member. In a preferred arrangement, the position of the valve actuator is visually indicated with a visual display, such as an indicator 115, that is attached to an indicator stem (not visible) operatively attached to the valve actuator 111. The indicator 115 rotates to show either a "closed" indication or an "open" indication, thereby visually indicating whether the valve is, respectively, closed or open. The position controller 110 optionally may also provide valve positioning instructions to the valve actuator 111 and/or accomplish other commands and/or purposes. The position controller 110 in some arrangements is a Vavletop® valve controller by Topworx, Inc. of Louisville, Kentucky. The position controller 110 may be adapted for use in different types of hazardous use environments or areas. When so adapted, the position controller 110 usually needs to visual display an indication of what hazardous area the position controller is certified to be used in.

Figure 2B:
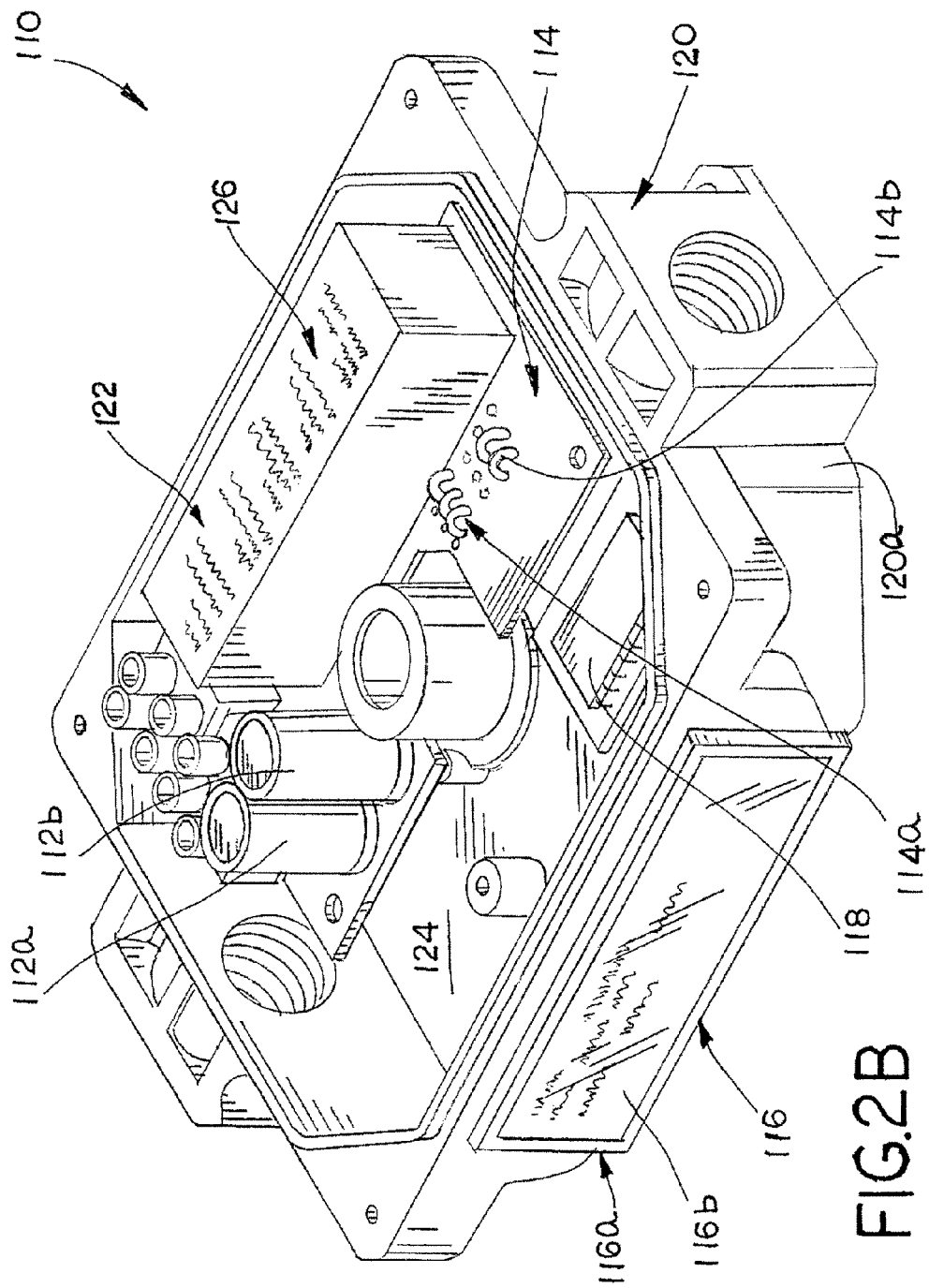
FIG. 2B is an isometric view of an interior of the configurable valve position controller of FIG. 2A.

As best seen in FIG. 2B, the position controller 110 includes the housing 20 in the form of a controller housing 120, the field device 12 in the form of one or more switches 112a, 112b, the first control circuit 14 in the form of a switch control circuit 114, an electronic display assembly 116, the second control circuit 18 in the form of a display control circuit 118, and a power supply module 122 for connection to an outside power supply. The components 112a,b, 114 116, 118 are arranged so that the switches 112a, 112b can be configured and/or reconfigured to emulate any one of a plurality of different types of switches (the "emulated switches"), and the electronic display assembly 116 will display information, such as safety certification information, relevant to the selected emulated switch. In this manner, the position controller 110 may be used for different types of applications, and the correct certification information will be displayed on the electronic display assembly 116 without needing to physically remove and replace or otherwise alter an identification and/or certification tag or nameplate.

At least one or more of the components, such as the switches 112a, 112b and/or the electronic display assembly 116, is carried by the switch housing 120. In one optional arrangement, the switch housing 120 is sized to carry all of the components 112a,b, 114 116, 118, 122 of the configurable switch assembly, such as in the form of a sealed or resealable box-like enclosure as depicted in FIGS. 2A and 2B. The switches 112a, 112b, the switch control circuit 114, the display control circuit 118, and the power supply module 122 are carried inside of an interior chamber 124 defined by a main body portion 120a of the controller housing 120, and the controller housing 120 is optionally sealed to prevent moisture and/or dirt from entering inside the interior chamber 124. Only the main body portion 120a of the controller housing 120 is shown in FIG. 2B, it being understood that a cover 120b of the controller housing 120 would be used to cover and preferably to seal the interior chamber 124 of the switch housing 120 as shown in FIG. 2A. A bore 125 is arranged to receive the indicator stem. The bore 125 extends through a central region of the controller housing 120, but may be disposed in other locations. The bore 125 is preferably sealed from the interior chamber 124. In other optional arrangements, one or more components, such as the switch control circuit 114, the display control circuit 118, and/or the power supply module 122 may be located remote from the controller housing 120 and functionally connected therewith via, for example, a bus or other data and/or electrical power connection.

The switch control circuit 114 is arranged to control operation of the switches 112a, 112b. The switch control circuit 114 is arranged to be selectively configured and/or reconfigured by a user such that the switches 112a, 112b emulate any selected one of a pre-selected plurality of different switch types (the "selected emulated switch"). In one optional arrangement, the switch control circuit 114 includes a printed circuit board and at least one or more leads 114a, 114b, such as jumpers, that can be selectively manipulated and configured by a user to complete any one of a number of different circuits, wherein each circuit is arranged to cause the switches 112a, 112b to emulate a different one of the types of switches. In some optional arrangements, the switch control circuit 114 additionally or alternatively includes a digital processor adapted to be configured by one or more software programs to form circuits arranged to allow the switches 112a, 112b to selectively emulate one or more of the selected switch types. In some arrangements, the switch control circuit 114 includes an insertable memory chip or card that plugs into a circuit board to control, for example, GO™ switches in lieu of using jumper switches. Optionally, the switch control circuit 114 and the display control circuit 118 may be combined in a single motherboard, integrated circuit chip, and/or chip set.

In some optional arrangements, a communication module 126 is carried by the controller housing 120, preferably within the interior chamber 124. The communication module 126 is optionally operatively connected with one or both of the switch control circuit 114 and the display control circuit 118. The communications module 126 is arranged to send and/or receive communication signals to and/or from an outside control module, sensor module, communications module, or other communication device. As shown in FIG. 2A, the communication module 126 optionally includes a port 128 arranged for operative connection to one or more analog or digital external communications lines 130. The communication module 126 preferably is adapted to allow the software programs and/or information sets to be loaded to the digital processor and/or the display control circuit 118. The communication module 126 may provide for a direct wired connection, such as through the port 128 to a remote internet connection or bus via the communication lines 130, a wireless data transfer connection, or any other arrangement sufficient to allow selected software and/or data to be loaded to the switch control circuit 114 and/or the display control circuit 118. The switch control circuit 114 may optionally include one or more combinations of both a hard-wired circuit, such as the printed circuit board, and a software controlled circuit, such as the digital processor, and/or other types of control circuitry.

In some optional arrangements, the port 128 is adapted to connect to an external power supply, such as a plant power supply. The port 128 is operatively connected to the power supply module 122 to supply electrical power to the power supply module 122 when the port 128 is connected, for example, to a bus with the communication lines 130.

The electronic display assembly 116 is arranged to selectively display different information, including text and/or graphics. In one optional arrangement, the electronic display assembly 116 includes a display housing 116a carried by the controller housing 120 and an electronic display screen 116b disposed inside the display housing. Preferably, the electronic display screen 116b includes at least one of an LCD, LED, an electroluminescent display, and/or a plasma display. However, the electronic display assembly 116 may take any form sufficient to intelligibly display the information of the various information sets as discussed herein.

The display control circuit 118 is operatively connected to the electronic display assembly 116 and to the switch control circuit 114. The display control circuit 118 is provide with and/or has access to a plurality of different information sets, wherein at least one of the different information sets corresponds with each of the emulated switches. The information sets are preferably stored within an electronic memory that is part of and/or associated with the display control circuit 118. Each information set includes information relative to the attributes of the corresponding emulated switch, preferably including for example, identity information, switch type information, operational characteristics information, and/or safety certification information. In one arrangement, each information set includes safety certification information that includes what type of hazardous operating environment in which the emulated switch is certified for use, such as in high-risk explosive areas, nuclear areas, high pressure underwater areas, harsh chemical areas, and the like. For example, the safety certification information in some arrangements corresponds with safety certification specifications and/or other technical standards as defined by various private and governmental organizations and/or directives, such as from Underwriters Laboratories ("UL"), the Conformite Europeenne ("CE"), International Electrotechnical Commission ("IEC"), IECEx or ATEX ("Ex"), Atomic Energy of Canada Limited ("AECL"), Institute of Electrical and Electronics Engineers ("IEEE"), and the like. The safety certification information preferably includes the specifications and/or standards that the position controller 110 meets for each organization and/or directive, such as area classification, division, group, zone, type, protection method, etc., as understood in the valve and process control industry. Additional and/or alternative information may be provided with the information sets, and preferably provides some relevant information regarding the corresponding emulated switch. The display control circuit 118 is arranged to cause the electronic display assembly 116 to display a selected one of the information sets corresponding to the selected emulated switch in response to the configuration (or re-configuration) of the switch control circuit 114 to cause the switches 112a, 112b to emulate the selected emulated switch.

In one optional arrangement, the switches 112a, 112b are magnetic proximity switches, such as the GO Switches described previously herein. In a preferred optional arrangement, the switch control circuit 114 can be selectively configured and/or reconfigured to cause the switches 112a, 112b to emulate one or more of an inductive switch, a numar switch, a dry contact switch, a PNP switch, an NPN switch, and/or other types of switches.

In one optional arrangement, the switches 112a, 112b, the switch housing 120, and the electronic display assembly 116 are rated for use in one or more different hazardous areas. For example, the position controller 110 may be rated for use in an area with flammable gasses, vapors, or liquid zones, combustible dust zones, ignitable fiber zones, and so on, such as defined by ATEX, IECEx, and/or other standards bodies. In one optional preferred arrangement, each of the plurality of information sets includes certification information for the corresponding emulated switch type that identifies the type of hazardous area or areas in which the selected emulated switch type is rated for acceptable use.

In one optional arrangement, the electronic display assembly 116 is disposed on an exterior wall of the switch housing 120, preferably on the main body portion 120a, and arranged to be readily visible by a person when the configurable process control device 110 is attached to a mounting structure. The switches 112a, 112b and the first and second control circuits 114 and 118 are disposed inside of the switch housing 120, such as in the interior chamber 124.

In one optional arrangement, the display control circuit 118 includes an integrated circuit, such as a micro-controller, and a digital memory. The digital memory may be part of the integrated circuit 118 or the digital memory may be separate from the integrated circuit and operatively connected thereto. The information sets are stored in the digital memory. The integrated circuit is arranged to select and retrieve an appropriate corresponding one of the information sets from the digital memory in response to signals received from the switch control circuit 114. The integrated circuit is arranged to cause the electronic display assembly 116 to display information representative of the selected one of the information sets, for example on the electronic display screen 116b.

Figure 3:
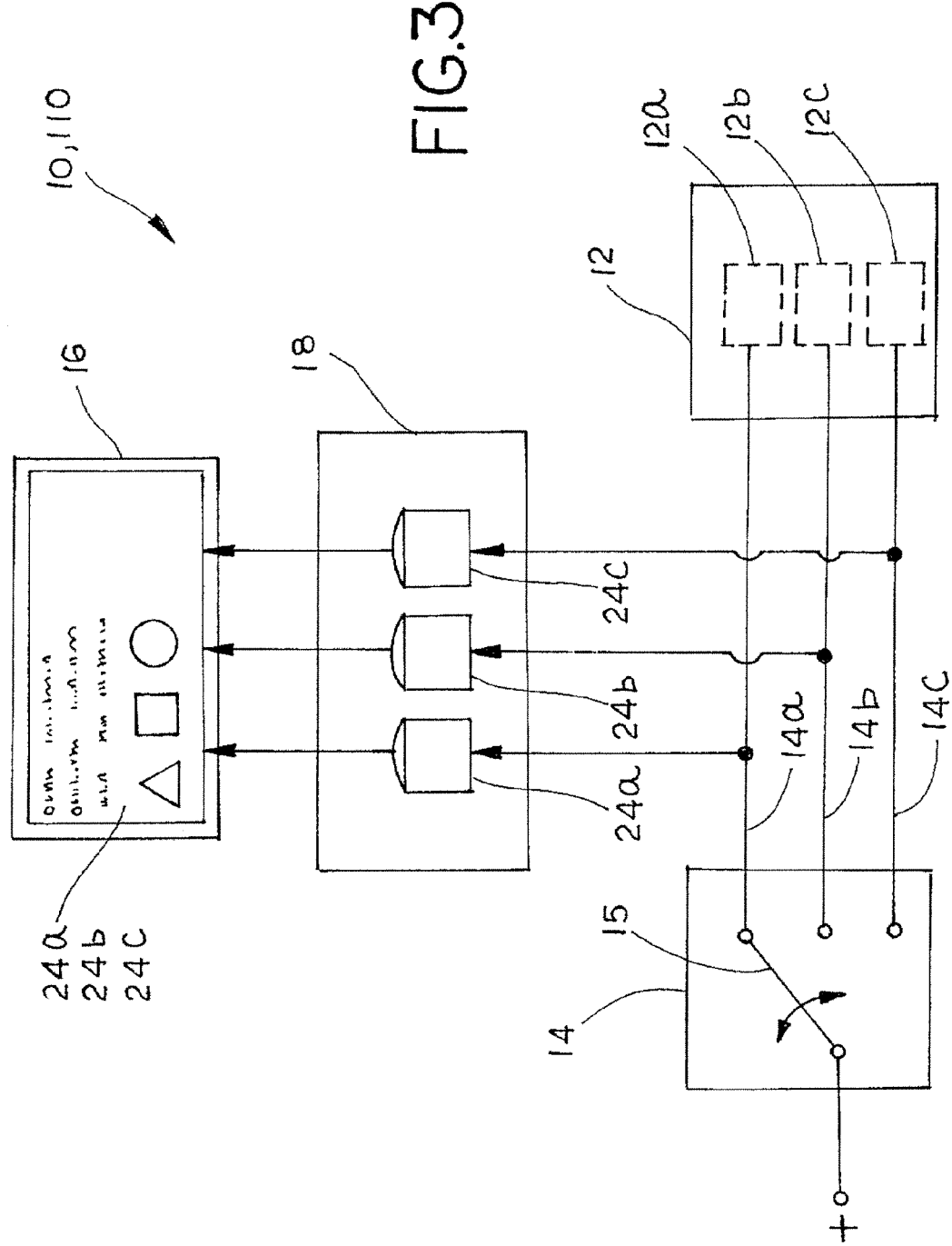
FIG. 3 is a functional schematic diagram applicable to each of the configurable process control device of FIG. 1 and the configurable valve position controller of FIG. 2.

Functionally, each of the configurable process control device 10 and the configurable switch assembly 110 may be conceived as shown schematically in FIG. 3. For simplicity, the following description only refers to the configurable process control device 10 with the understanding that the description also applies similarly to the position controller 110. The first control circuit 14 may be configured so as to complete any one of the configurable circuits 14a, 14b, 14c. Each configurable circuit 14a-c causes the field device 12 to function to emulate a different corresponding process control device type 12a, 12b, or 12c. The second control circuit 18 is functionally connected with the first control circuit 14 and/or the field device 12 and arranged to sense what process control device type 12a-c is being emulated. The second control circuit 18 is also operatively connected to the electronic display of the electronic display assembly 16 and arranged to cause the electronic display to display any one of different corresponding information sets 24a, 24b, 24c depending on what corresponding process control device type 12a-c is being emulated. When a user configures or reconfigures the first control circuit 14 to complete the first configurable circuit 14a, for example by arranging the jumper 15 to close the circuit 14a, the field device 12 functions to emulate a first process control device type 12a, and the second control circuit 18 causes the electronic display assembly 16 to display the first information set 24a. When a user configures or reconfigures the first control circuit 14 to complete the second configurable circuit 14b, for example by arranging the jumper 15 to close the circuit 14b, the field device 12 functions to emulate a second process control device type 12b, and the second control circuit 18 causes the electronic display assembly 16 to display the second information set 24b. In a similar manner, configuration or reconfiguration of the first control circuit 14 to complete the third circuit 14c, for example by arranging the jumper 15 to close the circuit 14c, or any additional configurable circuits, causes the field device 12 to function to emulate a corresponding process control device type (e.g., 12c) and causes the second control circuit 18 to display a corresponding information set (e.g., 24c) on the electronic display assembly 16.

In an exemplary method of using a configurable process control device of the present disclosure, such as the configurable process control device 10 and/or the position controller 110, certification information corresponding to any one of a plurality of the different types of process control devices may be displayed on the electronic display assembly 16 in response to the configuration of the first control circuit 14 without having to physically remove and/or replace a nameplate. A user configures the first control circuit 14 to cause the field device 12 to emulate a first selected one of the different types of process control devices (e.g., 12a). Optionally, configuring the first control circuit 14 may include configuring one or more circuit leads of the first control circuit 14, such as jumpers, to complete one of a plurality of different possible circuit configurations. The electronic display assembly 16 is automatically configured to display first certification information in response to the configuration of the first control circuit 14. The user may configure the control circuit 14 to cause the field device 12 to emulate at least a second selected one of the different types of process control devices, and the electronic display is automatically configured to display second certification information in response to the configuration of the device control circuit. The method may be repeated for additional types of process control devices and corresponding information sets in a similar manner.

In some arrangements, the position controller 110 and/or other configurable process control devices 10 are arranged to permanently fix the information displayed on the electronic display 116, 16 so that the displayed information cannot be changed after the having been configured a first or some subsequent time. For example, the electronic display 16, 116 may be an LCD display that permanently burns the originally displayed information onto the screen.

Each of the optional arrangements described herein may be arranged in any set of combinations or permutations sufficient to provide any combination of one or more functionalities suggested by the description provided herein. Further, it is understood that each of the features disclosed with respect to each exemplary arrangement may be combined in any functional combination, such as to provide any useful combination of functionalities as would be understood by a person of ordinary skill

INDUSTRIAL APPLICABILITY

A configurable process control device incorporating any one or more of the various arrangements and options disclosed herein is useful in many different process control applications. One exemplary configurable process control device is the valve position controller 110. The configurable process control devices described herein, however, are not limited to any particular industrial usage and may be used in any manner or application as desired.

Numerous modifications to the configurable process control devices disclosed herein will be apparent to those skilled in the art in view of the foregoing description. Accordingly, this description is to be construed as illustrative only and is presented for the purpose of enabling those skilled in the art to make and use the invention and to teach the preferred mode of carrying out same. The exclusive rights to all modifications within the scope of the disclosure and the appended claims are reserved.

I claim:

1. A configurable process control device for use in a plurality of use environments, wherein at least one of a predefined plurality of certifications must be displayed in conjunction with the configurable process control device depending on which of the use environments the configurable process control device is to be used in, the configurable process control device comprising:
   a field device comprising a magnetic proximity sensor switch;
   a first control circuit operatively coupled to the field device, the first control circuit arranged to control the field device and arranged to be reconfigured by a user to allow the field device to selectively emulate at least two different switch types, including at least one of a numar switch, a dry contact switch, a PNP switch, and an NPN switch;
   an electronic display assembly, the electronic display assembly arranged to selectively display different information; and
   a second control circuit, the second control circuit operatively coupled to the electronic display assembly and the first control circuit, the second control circuit having access to a plurality of different certification information sets, each certification information set corresponding to a different one of the at least two different switch types;
   wherein the second control circuit causes the electronic display assembly to display a selected one of the certification information sets corresponding to the switch type the field device has been selected to emulate.

2. The configurable process control device of claim 1, wherein the first control circuit comprises at least one lead arranged to be selectively configured to complete each of a plurality of different circuits corresponding to the at least two different switch types, wherein each of the plurality of certification information sets includes the identity or identities of the types of hazardous area or areas in which the selected switch type is rated for acceptable use as defined by a standards-generating organization.

3. The configurable process control device of claim 1, further comprising a housing, wherein the field device and the electronic display assembly are carried by the housing.

4. The configurable switch assembly of claim 1, wherein the second control circuit comprises a microcontroller and a digital memory, the plurality of certification information sets are stored in the digital memory, and the microcontroller is arranged to select the selected one of the information sets from the digital memory in response to signals received from the first control circuit and to cause the electronic display assembly to show information representative of the selected one of the certification information sets.

5. A valve position controller, comprising:
   a controller housing;
   a switch carried by the controller housing, wherein the switch comprises a magnetic proximity switch;
   a switch control circuit, the switch control circuit arranged to control the switch and arranged to be selectively reconfigured by a user to allow the switch to selectively emulate at least two of a pre-selected plurality of different switch types, wherein the plurality of different switch types includes at least two of an inductive switch, a numar switch, a dry contact switch, a PNP switch, and an NPN switch;

an electronic display assembly carried by the controller housing, the electronic display assembly arranged to selectively display different information; and a display control circuit, the display control circuit operatively connected to the electronic display assembly and the switch control circuit, the display control circuit having access to a plurality of different information sets, each information set containing different certification information of a corresponding one of the switch types;

wherein the display control circuit causes the electronic display assembly to display a selected one of the information sets, including the certification information, corresponding to which switch type the switch is configured to emulate.

6. The valve position controller of claim 5, the switch control circuit comprising at least one lead arranged to be selectively configured to complete any one of a plurality of different circuits, wherein each circuit corresponds to a different one of the plurality of different switch types.

7. The valve position controller of claim 5, wherein the proximity switch, the controller housing, and the electronic display assembly are rated for use in one or more hazardous areas.

8. The valve position controller of claim 7, wherein each of the plurality of information sets includes certification information for the corresponding switch type that lists the type of hazardous area or areas in which the selected switch type is rated for acceptable use.

9. The valve position controller of claim 7, wherein the electronic display assembly comprises:
a display housing carried by the controller housing; and
an electronic display screen disposed inside the display housing.

10. The valve position controller of claim 9, wherein the electronic display screen comprises at least one of a liquid crystal display, a light emitting diode display, an electroluminescent display, and plasma display.

11. The valve position controller of claim 5, wherein the display control circuit comprises an integrated circuit and a digital memory, the plurality of information sets stored in the digital memory, the integrated circuit arranged to select the selected one of the information sets from the digital memory in response to signals received from the switch control circuit and to cause the electronic display assembly to show information representative of the selected one of the information sets.

12. The valve position controller of claim 5, wherein the switch control circuit comprises a digital processor and a communication port, the digital processor adapted to be configured by a software program to form circuits arranged to allow the proximity switch to selectively emulate one or more of the selected switch types, and the communication port adapted to allow the software program to be loaded to the digital processor.

13. A method of displaying certification information for a configurable process control device, the configurable process control device having a field device and a device control circuit arranged to be selectively configured in each one of a pre-selected plurality of configurations to cause the field device to selectively emulate each one of a pre-selected plurality of different types of process control devices, the method comprising the steps:

configuring the device control circuit to cause the field device to emulate a first selected one of the different types of process control devices;

providing an electronic display with the field device; and configuring the electronic display to display first certification information in response to the configuration of the device control circuit, wherein the certification information includes what type of hazardous operating environment in which the emulated switch is certified for use corresponding with at least one of safety certification specifications and other technical standards as defined by at least one of a private certifying organization, a governmental organization, and a governmental directive, and wherein the certification information includes what certification specifications and/or technical standards the process control device meets for each respective organization and directive.

14. The method of claim 13, further comprising the step:
providing the electronic display secured to the configurable field device.

15. The method of claim 13, wherein the field device comprises a valve position controller including a switch assembly.

16. The method of claim 15, wherein the switch assembly comprises a magnetic proximity switch, and the step of configuring the device control circuit comprises the step of configuring one or more circuit leads to complete one of a plurality of different possible circuit configurations.

17. The method of claim 16, wherein the electronic display comprises at least one of a liquid crystal display, a light emitting diode display, an electroluminescent display, and plasma display.

18. The method of claim 13, further comprising the steps:
reconfiguring the device control circuit to cause the field device to emulate a second selected one of the different types of process control devices; and
reconfiguring the electronic display to display second certification information in response to the reconfiguration of the device control circuit.

* * * * *

UNITED STATES PATENT AND TRADEMARK OFFICE
CERTIFICATE OF CORRECTION

PATENT NO. : 9,116,514 B2  
APPLICATION NO. : 13/690237  
DATED : August 25, 2015  
INVENTOR(S) : Robert Lynn LaFountain Page 1 of 1

It is certified that error appears in the above-identified patent and that said Letters Patent is hereby corrected as shown below:

In the Specification:

At Column 2, line 12, "numar" should be -- namur --.

At Column 3, line 19, "numar" should be -- namur --.

At Column 5, line 15, "numar" should be -- namur --.

At Column 6, line 36, "micro-controller 18" should be -- micro-controller 18a --.

At Column 6, line 43, "micro-controller 18" should be -- micro-controller 18a --.

At Column 10, line 6, "numar" should be -- namur --.

At Column 10, line 25, "control device 110" should be -- control device 10 --.

In the Claims:

At Column 12, line 24, "numar" should be -- namur --.

At Column 12, line 52, "switch assembly of" should be -- process control device of --.

At Column 13, line 4, "numar" should be -- namur --.

Signed and Sealed this  
Nineteenth Day of April, 2016

Michelle K. Lee  
*Director of the United States Patent and Trademark Office*